US009316186B2

(12) United States Patent
Jacques

(10) Patent No.: US 9,316,186 B2
(45) Date of Patent: Apr. 19, 2016

(54) ENGINE INTAKE WITH SUMP HAVING A HEAT SOURCE

(71) Applicant: GM Global Technology Operations LLC, Detroit, MI (US)

(72) Inventor: Robert Lionel Jacques, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/248,953

(22) Filed: Apr. 9, 2014

(65) Prior Publication Data

US 2015/0292451 A1 Oct. 15, 2015

(51) Int. Cl.
*F02M 35/00* (2006.01)
*F02M 35/10* (2006.01)
*F02M 35/02* (2006.01)
*F02M 35/104* (2006.01)
*F02B 29/04* (2006.01)

(52) U.S. Cl.
CPC ...... *F02M 35/10268* (2013.01); *F02B 29/0437* (2013.01); *F02M 35/02* (2013.01); *F02M 35/104* (2013.01); *F02M 35/10026* (2013.01); *F02M 35/10032* (2013.01); *F02M 35/10288* (2013.01)

(58) Field of Classification Search
CPC ... F02B 29/0406; F02B 31/04; F02B 29/0418
USPC .................. 123/184.21–184.61, 542, 556
See application file for complete search history.

(56) References Cited

U.S. PATENT DOCUMENTS

| 3,892,215 | A | * | 7/1975 | Hickling et al. | 123/549 |
| 4,327,698 | A | * | 5/1982 | Hamai et al. | 123/568.17 |
| 5,662,077 | A | * | 9/1997 | Boswell | 123/184.21 |
| 5,680,839 | A | * | 10/1997 | Moore | 123/184.58 |
| 6,446,591 | B1 | * | 9/2002 | Chae et al. | 123/184.61 |
| 7,762,229 | B2 | * | 7/2010 | Abe et al. | 123/306 |
| 8,371,119 | B2 | | 2/2013 | Durand et al. | |
| 8,783,233 | B2 | * | 7/2014 | Cockerill et al. | 123/542 |
| 2009/0272356 | A1 | * | 11/2009 | Abe et al. | 123/184.56 |
| 2010/0263637 | A1 | * | 10/2010 | Muller et al. | 123/556 |
| 2011/0094219 | A1 | * | 4/2011 | Palm | 60/599 |
| 2013/0180507 | A1 | * | 7/2013 | Nakasugi et al. | 123/542 |
| 2014/0100074 | A1 | * | 4/2014 | Glugla | 477/3 |
| 2014/0216387 | A1 | * | 8/2014 | Kulkarni | 123/184.47 |

FOREIGN PATENT DOCUMENTS

JP 2013096353 A * 5/2013

OTHER PUBLICATIONS

Machine translation of JP 2013096353 A, see "JP2013096353A_MachineTranslation.pdf".*
Machine translation of JP2013096353A, published May 2013.*

* cited by examiner

*Primary Examiner* — Lindsay Low
*Assistant Examiner* — Long T Tran
(74) *Attorney, Agent, or Firm* — BrooksGroup

(57) ABSTRACT

A number of variations may include a product including an intake system to provide air to an engine, the intake system including an inlet manifold to provide an air flow pathway to an inlet port; wherein the inlet manifold includes a false floor at least partially defining a plenum, the plenum at least partially separated from a sump, the sump at least partially defined in a lower portion of the inlet manifold; and wherein the sump includes a heat source.

26 Claims, 4 Drawing Sheets

ENGINE INTAKE WITH SUMP HAVING A HEAT SOURCE

TECHNICAL FIELD

The field to which the disclosure generally relates to includes engine intake systems.

BACKGROUND

Engines use fuel to create mechanical work and may include intake systems to manage the intake of air into the engine.

SUMMARY OF ILLUSTRATIVE VARIATIONS

A number of variations may include a product including an intake system to provide air to an engine, the intake system including an inlet manifold to provide an air flow pathway to an inlet port; wherein the inlet manifold includes a false floor at least partially defining a plenum, the plenum at least partially separated from a sump, the sump at least partially defined in a lower portion of the inlet manifold; and wherein the sump includes a heat source.

A number of variations may include a method including providing an intake system to provide air to an engine, the intake system including an inlet manifold to provide an air flow pathway to an inlet port; wherein the inlet manifold includes a false floor at least partially defining a plenum, the plenum at least partially separated from a sump, the sump at least partially defined in a lower portion of the inlet manifold; and wherein the sump includes a heat source.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
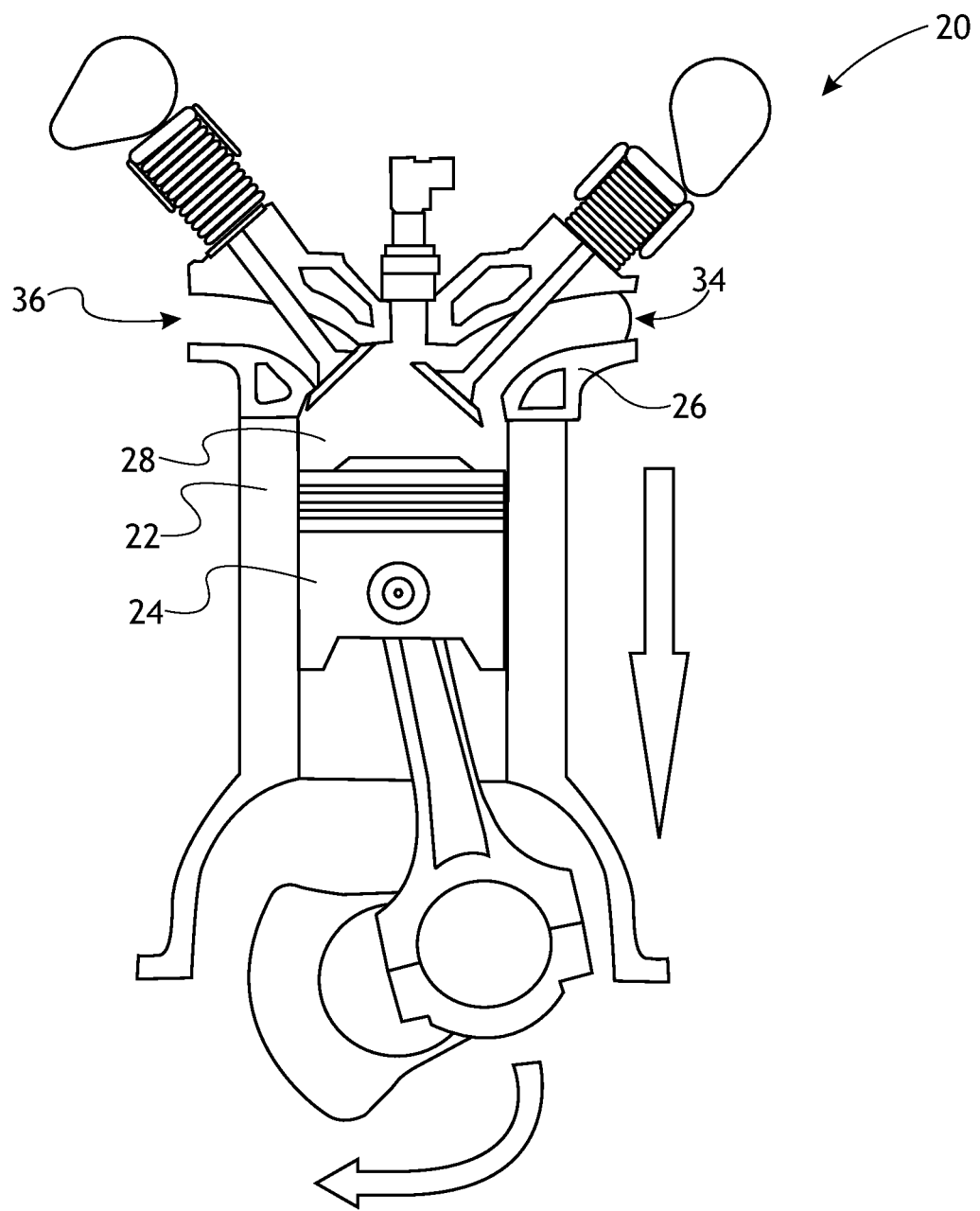
FIG. 1 is a schematic sectional view of a portion of an engine according to a number of variations.

A number of variations may include an intake system to provide air to an internal combustion engine. FIG. 1 semi-schematically shows an example of an engine 20 according to a number of variations. The engine 20 may be any type of spark-ignition engine (e.g., gasoline engine) or compression-ignition engine (e.g., diesel engine) and may use any type of suitable liquid or gaseous fuel. The engine 20 may include one or more cylinders 22 with associated pistons 24 in a block that, along with a cylinder head 26, define one or more combustion chambers 28 with associated inlet ports 34 and exhaust ports 36.

Figure 2:
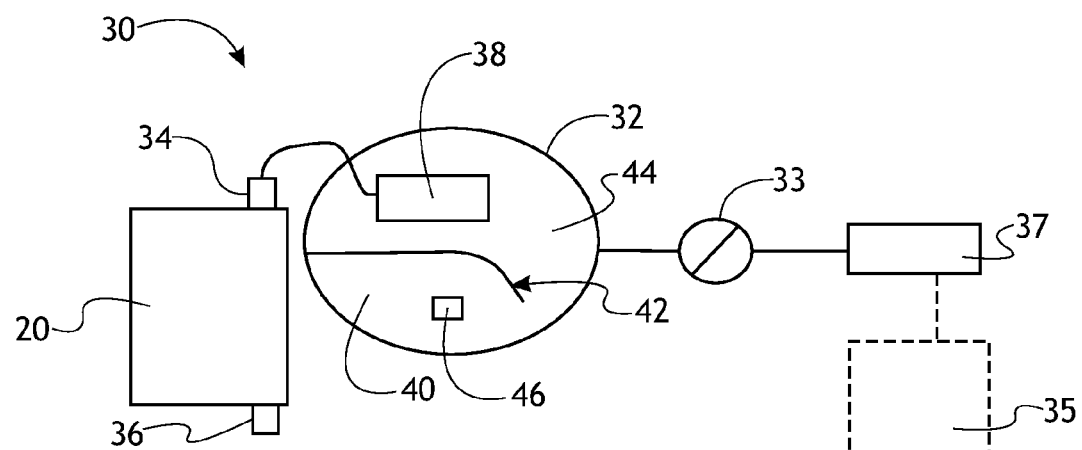
FIG. 2 is a schematic illustration of an engine and intake system according to a number of variations.
Figure 3:
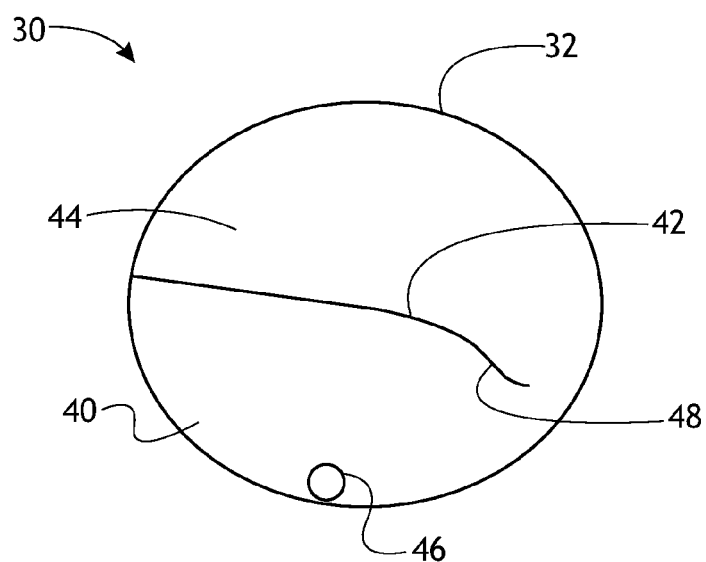
FIG. 3 is a schematic illustration of an intake system according to a number of variations.

Referring generally to FIGS. 2 and 3, a number of variations may include an intake system 30 that may include an inlet manifold 32 to provide an air flow pathway for inlet ports 34 that facilitate air flow into the combustion chambers 28. Combustion chambers 28 are not identified in either FIG. 2 or 3. The air flow pathway may include a primary zone of air flow in which the intake system 30 guides at least a portion of the air in the inlet manifold 32 toward the inlet ports 34. A throttle valve 33 may be used in accordance with a number of variations to control the rate of air flow into the inlet manifold 32. A number of variations may include a boost system (e.g., a turbocharger and/or supercharger) to provide pressurized air flow into the intake system 30. A number of variations may include an exhaust gas recirculation (EGR) system to recirculate exhaust gas from exhaust ports 36 back into the intake system 30. It is to be understood that various configurations conduit, valves, and controls may be used to operate the boost system and the EGR system, if one or both are included (represented generically by 35 with connection to an air supply 37 that feeds into the throttle valve 33). The intake system 30 may include an intercooler 38 located upstream from the inlet ports 34 to provide cooling of air prior to entry into the combustion chambers 28.

A number of variations may include a sump 40 that may serve to collect condensate developed in the intake system 30 in and/or around an area including the intercooler 38. In a number of variations, the sump 40 may be located generally below the intercooler 38 with respect to a vehicle roof (top) in such a way as to manage condensate that may develop in the intake system 30.

A number of variations may include an inlet manifold 32 that incorporates the intercooler 38 and the sump 40. The inlet manifold 32 may include a false floor 42 to direct condensate into the sump 40. The false floor 42 may be defined at least in part by a section of material extending from an interior surface of the inlet manifold 32 into an interior portion of the inlet manifold 32, at least partially defining a plenum 44. The false floor 42 may be located generally below a primary air flow passage and generally above the sump 40. The false floor 42 may provide a surface for condensate to follow in order to drain into the sump 40. It is to be understood that various surfaces of the inlet manifold 32 may help to channel condensate toward the sump 40.

In a number of variations, the sump 40 may include a heat source 46 that may vaporize condensate for the engine 20 to ingest as water vapor. The heat source 46 may be shielded from at least a portion of the air flow going into the inlet ports 34. For example, the false floor 42 may direct a primary stream of airflow generally toward the inlet ports 34 and generally away from the sump 40, effectively shielding the heat source 46 from the primary air flow. A number of variations may include a heating element as the heat source 46 in the sump. For example, electric current passing through resistance in the heating element may generate heat. A number of variations may include a hot engine coolant tube as the heat source 46 in the sump. In a number of variations hot coolant may be available from EGR cooler coolant outlet, engine coolant out, coolant exit from an IEM (integrated exhaust manifold), coolant coming from engine or transmission oil heat exchangers, or radiator by-pass flow. Routing intercooler coolant return to the CRFM through the tube in the manifold may also provide sufficient heat to re-vaporize condensate in the inlet manifold.

A number of variations may include a roof 48 for the sump 40 that may channel steam from vaporization of condensate into the plenum 44. The roof 48 may help provide a directed pathway to allow exit of steam from the sump 40 into the plenum 44. The roof 48 may be defined at least in part by a lower surface of the false floor 42, which also defines an upper surface of the sump 40. The sump roof configuration may be designed to block condensate from entering inlet manifold plenum in liquid form as a result of forces experienced from vehicle acceleration, braking or cornering.

Figure 4:
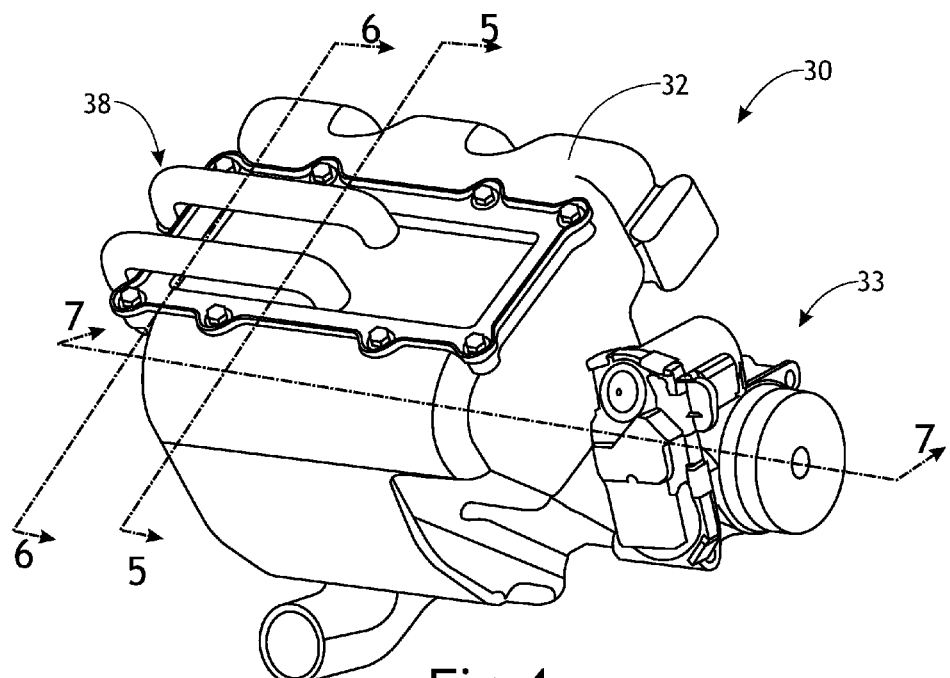
FIG. 4 is a perspective view illustration of an intake system according to a number of variations.
Figure 5:
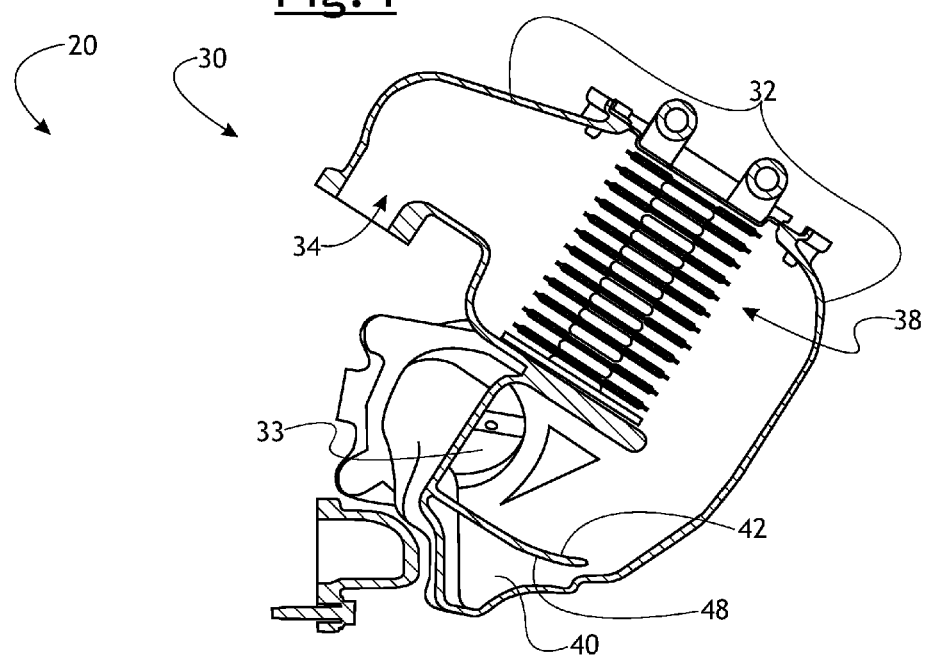
FIG. 5 is a cross-sectional view of the intake system of FIG. 4 according to a number of variations.
Figure 6:
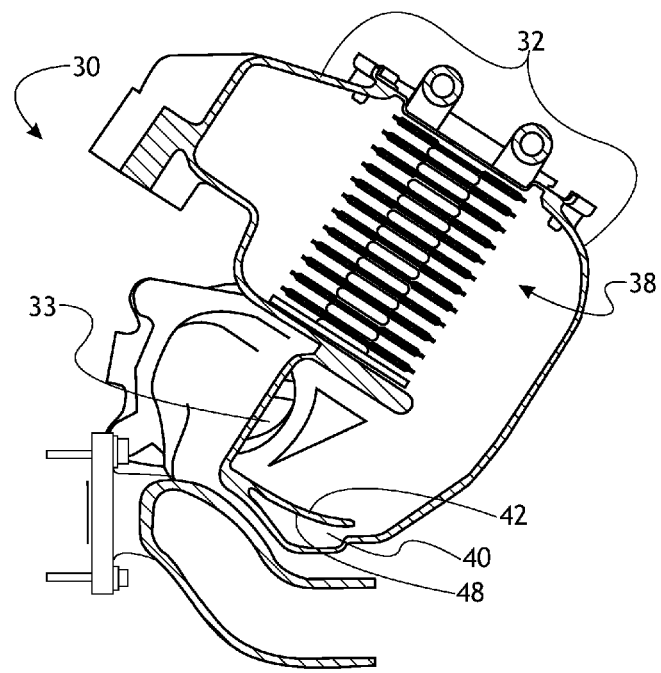
FIG. 6 is another cross-sectional view of the intake system of FIG. 4 according to a number of variations.
Figure 7:
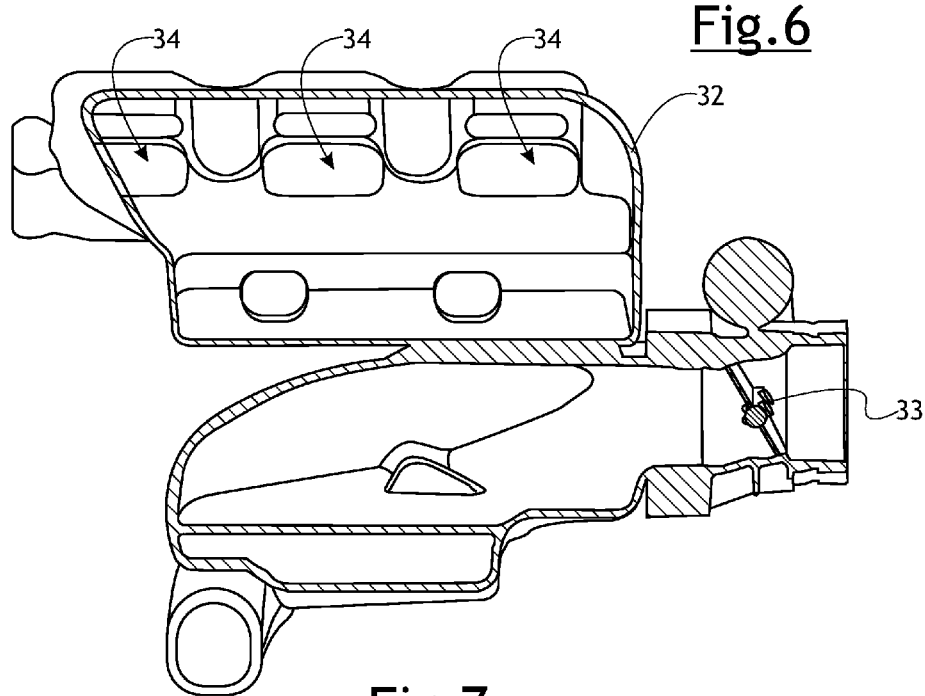
FIG. 7 is yet another cross-sectional view of the intake system of FIG. 4 according to a number of variations.

FIG. 4 depicts a portion of an example intake system in perspective view according to a number of variations and provides a reference for cross-sectional views of the same in FIGS. 5-7. FIG. 5 is a cross-sectional view into a plane defined in FIG. 4 referenced by A-A. FIG. 6 is a cross-sectional view into a plane defined in FIG. 4 referenced by B-B. FIG. 7 is a cross-sectional view into a plane defined in FIG. 4 referenced by C-C. Heating elements may be positioned in the condensate sump at its lowest point or in physical contact with the outer surface of the manifold sump. A metallic heating plate may be warmed by either resistive heating or engine coolant could also be integrated as the bottom surface of the sump.

A number of variations may provide for an intercooler 38 to be located below the inlet ports 34 without creating a water slugging effect. Slugging may occur as a result of water condensation accumulating in a low location in the engine induction system. This may result from operation during high humidity conditions or as a result of water in EGR gas as water is a by-product of combustion. If there is no low point in the system and the induction system can drain continuously into the inlet ports, condensate slugging would not occur. A number of variations may include a means of having an intercooler 38 positioned down hill from inlet ports 34 that may vaporize condensate for ingestion to the engine 20.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product including an intake system to provide air to an engine, the intake system including an inlet manifold to provide an air flow pathway to an inlet port; wherein the inlet manifold includes a false floor at least partially defining a plenum, the plenum at least partially separated from a sump, the sump at least partially defined in a lower portion of the inlet manifold; and wherein the sump includes a heat source.

Variation 2 may include a product as set forth in Variation 1 wherein the false floor is defined at least in part by a section of material extending from an interior surface of the inlet manifold into an interior portion of the inlet manifold.

Variation 3 may include a product as set forth in any of Variations 1-2 wherein the false floor is located generally below a primary air flow passage and generally above the sump.

Variation 4 may include a product as set forth in any of Variations 1-3 wherein the false floor includes a surface for condensate to drain toward an opening to the sump.

Variation 5 may include a product as set forth in any of Variations 1-4 wherein the heat source is shielded from air flow through the intake system.

Variation 6 may include a product as set forth in any of Variations 1-5 wherein the intake system includes an intercooler located upstream from the inlet ports to provide cooling of air prior to entry into the combustion chambers.

Variation 7 may include a product as set forth in any of Variations 1-6 wherein the heat source is a heating element.

Variation 8 may include a product as set forth in any of Variations 1-6 wherein the heat source is an engine coolant tube.

Variation 9 may include a product as set forth in any of Variations 1-8 wherein the sump includes a roof to channel steam toward the plenum.

Variation 10 may include a method comprising providing an intake system to provide air to an engine, the intake system including an inlet manifold to provide an air flow pathway to an inlet port; wherein the inlet manifold includes a false floor at least partially defining a plenum, the plenum at least partially separated from a sump, the sump at least partially defined in a lower portion of the inlet manifold; and wherein the sump includes a heat source.

Variation 11 may include a method as set forth in Variation 10 wherein the false floor is defined at least in part by a section of material extending from an interior surface of the inlet manifold into an interior portion of the inlet manifold.

Variation 12 may include a method as set forth in any of Variations 10-11 wherein the false floor is located generally below a primary airflow passage and generally above the sump.

Variation 13 may include a method as set forth in any of Variations 10-12 wherein the false floor includes a surface for condensate to drain toward an opening to the sump Variation 14 may include a method as set forth in any of Variations 10-13 wherein the heat source is shielded from air flow through the intake system.

Variation 15 may include a method as set forth in any of Variations 10-14 wherein the intake system includes an intercooler located upstream from the inlet ports to provide cooling of air prior to entry into the combustion chambers.

Variation 16 may include a method as set forth in any of Variations 10-15 wherein the heat source is a heating element.

Variation 17 may include a method as set forth in any of Variations 10-15 wherein the heat source is an engine coolant tube.

Variation 18 may include a method as set forth in any of Variations 10-17 wherein the sump includes a roof to channel steam toward the plenum.

The above description of select variations within the scope of the invention is merely illustrative in nature and, thus, variations or variants thereof are not to be regarded as a departure from the spirit and scope of the invention.

What is claimed is:
1. A product comprising:
an intake system to provide air to an engine, the intake system including an inlet manifold to provide an air flow pathway to an inlet port;
wherein the inlet manifold includes a false floor at least partially defining a plenum, the plenum at least partially separated from a sump, the sump at least partially defined in a lower portion of the inlet manifold; and wherein the sump includes a heat source, and wherein the false floor includes a surface for condensate to drain toward an opening to the sump.

2. A product as set forth in claim 1 wherein the false floor is defined at least in part by a section of material extending from an interior surface of the inlet manifold into an interior portion of the inlet manifold.

3. A product as set forth in claim 1 wherein the false floor is located generally below a primary air flow passage and generally above the sump.

4. A product as set forth in claim 1 wherein the heat source is shielded from air flow through the intake system.

5. A product as set forth in claim 1 wherein the intake system includes an intercooler located upstream from the inlet ports to provide cooling of air prior to entry into the combustion chambers.

6. A product as set forth in claim 1 wherein the heat source is a heating element.

7. A product as set forth in claim 1 wherein the heat source is an engine coolant tube.

8. A product as set forth in claim 1 wherein the sump includes a roof to channel steam toward the plenum.

9. A method comprising providing an intake system to provide air to an engine, the intake system including an inlet manifold to provide an air flow pathway to an inlet port;
wherein the inlet manifold includes a false floor at least partially defining a plenum, the plenum at least partially separated from a sump, the sump at least partially defined in a lower portion of the inlet manifold; and
wherein the sump includes a heat source, and wherein the false floor includes a surface for condensate to drain toward an opening to the sump.

10. A method as set forth in claim 9 wherein the false floor is defined at least in part by a section of material extending from an interior surface of the inlet manifold into an interior portion of the inlet manifold.

11. A method as set forth in claim 9 wherein the false floor is located generally below a primary air flow passage and generally above the sump.

12. A method as set forth in claim 9 wherein the heat source is shielded from air flow through the intake system.

13. A method as set forth in claim 9 wherein the intake system includes an intercooler located upstream from the inlet ports to provide cooling of air prior to entry into the combustion chambers.

14. A method as set forth in claim 9 wherein the heat source is a heating element.

15. A method as set forth in claim 9 wherein the heat source is an engine coolant tube.

16. A method as set forth in claim 9 wherein the sump includes a roof to channel steam toward the plenum.

17. A method as set forth in claim 9 wherein the heat source is constructed and arranged to vaporize condensate.

18. A product comprising:
an intake system to provide air to an engine, the intake system including an inlet manifold to provide an air flow pathway to an inlet port;
wherein the inlet manifold includes a false floor at least partially defining a plenum, the plenum at least partially separated from a sump, the sump at least partially defined in a lower portion of the inlet manifold;
wherein the sump includes a heat source,
further comprising an intercooler in the manifold positioned between the false floor and the inlet port.

19. A product as set forth in claim 18, wherein the false floor includes a surface for condensate to drain toward an opening to the sump.

20. A product as set forth in claim 18 wherein the heat source is constructed and arranged to vaporize condensate in the sump.

21. A product as set forth in claim 18 wherein the heat source is in the sump and comprises at least one of an electric heating element or a hot engine coolant tube.

22. A product as set forth in claim 18 wherein the heat source is constructed and arranged to vaporize condensate.

23. A method comprising providing an intake system to provide air to an engine, the intake system including an inlet manifold to provide an air flow pathway to an inlet port;
wherein the inlet manifold includes a false floor at least partially defining a plenum, the plenum at least partially separated from a sump, the sump at least partially defined in a lower portion of the inlet manifold;
wherein the sump includes a heat source,
further comprising vaporizing condensate in the sump using the heat source.

24. A method as set forth in claim 23 further comprising an intercooler in the manifold positioned downstream of the sump.

25. A method as set forth in claim 23 wherein the heat source comprises an electric heating element.

26. A method as set forth in claim 23 wherein the heat source comprises or a hot engine coolant tube.

* * * * *